(12) United States Patent
Desai et al.

(10) Patent No.: US 12,156,040 B2
(45) Date of Patent: Nov. 26, 2024

(54) CONNECTION ASSESSMENT SYSTEM

(71) Applicant: Apple Inc., Cupertino, CA (US)

(72) Inventors: Ranjit Desai, Cupertino, CA (US); Joel N. Kerr, San Jose, CA (US); Borna Ghavam, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 17/320,178

(22) Filed: May 13, 2021

(65) Prior Publication Data

US 2022/0095123 A1     Mar. 24, 2022

Related U.S. Application Data

(60) Provisional application No. 63/083,085, filed on Sep. 24, 2020.

(51) Int. Cl.
| | |
|---|---|
| *H04W 16/22* | (2009.01) |
| *G06T 11/00* | (2006.01) |
| *G08B 6/00* | (2006.01) |
| *H04W 4/029* | (2018.01) |

(52) U.S. Cl.
CPC .......... *H04W 16/225* (2013.01); *G06T 11/00* (2013.01); *G08B 6/00* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 8,170,583 B2 * | 5/2012 | Shkedi .................. | H04W 4/023 455/433 |
| 9,158,375 B2 | 10/2015 | Maizels et al. | |
| 9,357,348 B2 * | 5/2016 | Evans .................. | H04W 4/029 |
| 9,383,582 B2 | 7/2016 | Tang et al. | |
| 9,390,302 B2 * | 7/2016 | Bassan-Eskenazi .......... | G01S 13/767 |
| 9,488,488 B2 | 11/2016 | Waldman | |

(Continued)

FOREIGN PATENT DOCUMENTS

| | | |
|---|---|---|
| DE | 102017126861 A1 | 5/2019 |
| WO | 2011/144968 A1 | 11/2011 |
| WO | 2014105264 | 7/2014 |

OTHER PUBLICATIONS

Moderndaytech, "PIXIE—Bluetooth Tracker meets AR (Augmented Reality)," Youtube.com, URL: https://www.youtube.com/watch?v=uKAA-sxaK68 (Year: 2017).*

(Continued)

*Primary Examiner* — David H Chu

(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to identifying connection quality for locations within an environment. A first computing device may collect environment information pertaining to a layout of an environment in which the first computing device and a second computing device are located. The first computing device may be in wireless communication with the second computing device. The first computing device may determine, based on the environment information, a location within the environment to locate the first computing device to improve the wireless communication. The first computing device may provide an indication of the location to a user of the first computing device.

20 Claims, 10 Drawing Sheets

(56) References Cited

U.S. PATENT DOCUMENTS

| | | | |
|---|---|---|---|
| 9,685,004 B2 | 6/2017 | Wang et al. | |
| 10,516,999 B1* | 12/2019 | Desai | H04W 16/28 |
| 2005/0245275 A1* | 11/2005 | Byford | H04W 4/02 |
| | | | 455/456.6 |
| 2012/0166077 A1* | 6/2012 | Herzog | G01C 21/3652 |
| | | | 701/425 |
| 2013/0195314 A1* | 8/2013 | Wirola | H04W 64/00 |
| | | | 382/103 |
| 2015/0103685 A1* | 4/2015 | Butchko | H04L 43/55 |
| | | | 455/67.14 |
| 2016/0203648 A1 | 7/2016 | Bilbrey et al. | |
| 2016/0249241 A1* | 8/2016 | Barmettler | G06F 3/04847 |
| 2018/0321687 A1* | 11/2018 | Chambers | H04W 24/08 |
| 2018/0356241 A1* | 12/2018 | Correnti | G08B 7/066 |
| 2019/0387415 A1* | 12/2019 | Scahill | H04W 16/26 |
| 2020/0099544 A1* | 3/2020 | Dickens | H04L 12/2838 |
| 2020/0169894 A1* | 5/2020 | Dillon | H04W 16/18 |
| 2020/0265644 A1* | 8/2020 | Kharisov | G06T 19/006 |
| 2020/0312005 A1 | 10/2020 | Desai et al. | |
| 2021/0039255 A1* | 2/2021 | Lee | B25J 9/1697 |
| 2021/0084494 A1* | 3/2021 | Angelov | H04L 47/83 |
| 2022/0407666 A1* | 12/2022 | Lim | H04L 5/0098 |

OTHER PUBLICATIONS

Sarah Silbert, "The PhoneStation uses your smartphone as a head-mounted display," URL: https://www.engadget.com/2014-06-04-phonestation-head-mounted-display.html?guccounter=1&guce_referrer=aHR0cHM6Ly93d3cuZ29vZ2xlLmNvbS8&guce_referrer_sig=AQAAAI4wr5WVwY4pNpv9jEkflnC2L52EFZjTDIM3Bi2Kv1HpCjjvfz (Year: 2014).*

International Search Report and Written Opinion in PCT Appl. No. PCT/US2021/041881 mailed Oct. 28, 2021, 14 pages.

* cited by examiner

CONNECTION ASSESSMENT SYSTEM

The present application claims priority to U.S. Prov. Appl. No. 63/083,085, filed Sep. 24, 2020, which is incorporated by reference herein in its entirety.

BACKGROUND

Technical Field

This disclosure relates generally to wireless computing devices and, more specifically, to a connection assessment system.

Description of the Related Art

When computing devices communicate information with one another, this communication may occur over a physical wired connection or a wireless connection. With wireless connections, signals are often propagated through objects such as walls when transmitted between computing devices. Such objects can weaken wireless signals such that the ability to transmit data between two computing devices is impaired. When a user wishes to perform some action (e.g., watching a movie) that requires a high transfer of information, such an action may be severely impacted by objects that interfere with the signals transmitted from the user's device to a network device such as a router. A user, however, may be unaware that the cause of their issues in performing an action may, in part, be due to physical objects causing interference.

Figure 1:
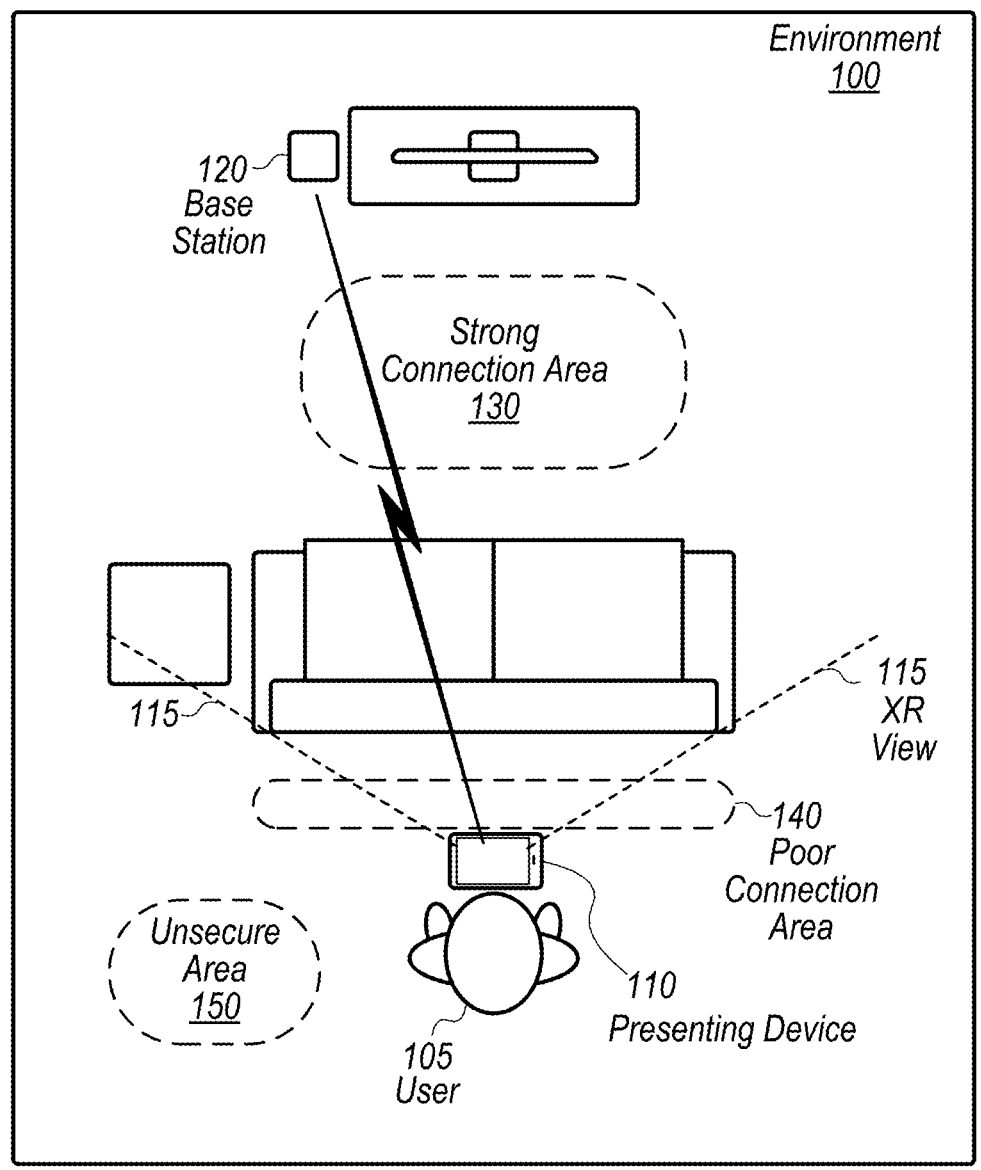
FIG. 1 is a block diagram illustrating example elements of a physical environment in which a system that is capable of producing an extended reality (XR) environment is deployed, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

A physical environment refers to a physical world that people can sense and/or interact with without the aid of electronic systems. The physical environment may include physical features such as a physical surface or a physical object. For example, the physical environments may correspond to a physical park that includes physical trees, physical buildings, and physical people. People can directly sense and/or interact with the physical environment, such as through sight, touch, hearing, taste, and smell.

In contrast, an extended reality (XR) environment (or a computer-generated reality (CGR) environment) refers to a wholly or partially simulated environment that people sense and/or interact with via an electronic system. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect a person's head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust character-istic(s) of graphical content in the XR environment in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environ-ments, a person may sense and/or interact only with audio objects.

Examples of XR include virtual reality and mixed reality.

A virtual reality (VR) environment refers to a simulated environment that is designed to be based entirely on com-puter-generated sensory inputs for one or more senses. A VR environment comprises a plurality of virtual objects with which a person may sense and/or interact. For example, computer-generated imagery of trees, buildings, and avatars representing people are examples of virtual objects. A per-son may sense and/or interact with virtual objects in the VR environment through a simulation of the person's presence within the computer-generated environment, and/or through a simulation of a subset of the person's physical movements within the computer-generated environment.

A mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or repre-sentations thereof). For example, a system may account for movements so that a virtual tree appears stationery with respect to the physical ground.

Examples of mixed realities include augmented reality and augmented virtuality.

An augmented reality (AR) environment refers to a simu-lated environment in which one or more virtual objects are superimposed over a physical environment, or a represen-tation thereof. For example, an electronic system for pre-senting an AR environment may have a transparent or translucent display through which a person may directly view the physical environment. The system may be config-ured to present virtual objects on the transparent or trans-lucent display, so that a person, using the system, perceives the virtual objects superimposed over the physical environ-ment. Alternatively, a system may have an opaque display and one or more imaging sensors that capture images or video of the physical environment, which are representa-tions of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical envi-ronment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physi-cal environment, for example, as a hologram or on a physical surface, so that a person, using the system, perceives the virtual objects superimposed over the physical environment.

An augmented reality environment also refers to a simu-lated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) por-tions thereof, such that the modified portion may be repre-sentative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

DETAILED DESCRIPTION

In some instances, a user might wish to partake in an extended reality (XR) experience (e.g., using virtual reality (VR), augmented reality (AR), or mixed reality (MR)) in which the user interacts with an immersive artificial environment such that the user feels as if they were physically in that environment. For example, users may view images through a VR system to feel as if they are moving within a scene from a first-person point of view. Similarly, mixed reality (MR) may combine computer generated data (virtual content) with real-world images (or a real-world view) to augment a user's view of the real world, or alternatively combines virtual representations of real-world objects with the views of a three-dimensional (3D) virtual world.

In order to interact with an XR environment, a user might use a computing device that displays images of the XR environment to the user. In some instances, producing an XR environment may involve wireless communication between the system (e.g., head-mounted display (HMD), smartphone, etc.) being used by the user and another system that helps produce the CGR environment. If, however, the signals being propagated between those systems are impaired (e.g., by physical objects between or near those systems), then the XR environment may not be properly rendered (e.g., a base station might not be able to provide XR images to the computing device). In some instances, the computing device may have a poor connection that causes audio and/or video frames to be dropped or come in late. For example, if a user is participating with another individual in a virtual engagement and the user's computing device has a poor connection, then user may have a low quality view of the other individual or may be unable to properly hear them. As a result, a user may have a poor experience with the XR environment that is intended to be immersive.

The present disclosure describes various techniques for identifying areas in a physical environment where a presenting computing device, which may be presenting an XR experience, can be located to potentially obtain a suitable connection quality with another computing device (e.g., a base station) assisting the presenting computing device. These techniques can further be used to identify areas that may provide a degraded connection between the presenting device and the other assisting computing device. In various embodiments described below, the presenting device wirelessly communicates with an assisting base station in order to produce an XR environment. The presenting device, in some embodiments, collects environment information about the physical environment in which the presenting device and the base station reside. The environment information may include information about what physical objects are present in the physical environment and where they reside. Based on that environment information, the presenting device (and/or the base station) may calculate scores for different areas within the environment. Each score may be indicative of the connection quality between the presenting device and the base station when the HMD is located in the area that corresponds to that score.

Based on the scores, in some embodiments, the presenting device determines an area (or location) in the environment at which to locate the presenting device in order to improve the wireless communication between the presenting device and the base station—or to provide a user with a connection quality sufficient for the activity in which that user is engaged. Once the presenting device has determined an area, the presenting device may display images to the user or produce other sensory feedback (e.g., haptic responses) that guide the user through the environment to that area. In some embodiments, the presenting device can also produce sensory feedback that indicates areas that the user should avoid while engaging in the user's activity.

These techniques may be advantageous as they provide a way to identify areas within a physical environment that have improved or sufficient connection quality to enable a user to have a more seamless XR-based experience. These techniques can also identify areas that a user should avoid while engaged in certain XR-based experience. For example, if a user is engaged in a virtual business conference, then these techniques may identify areas where other people could potentially eavesdrop on the user's conversations and thus the user could avoid such areas. These techniques may be advantageous over other approaches that simply analyze the connection strength between two devices, which involves moving one of the devices to test the connection strength at different locations within a physical environment. In contrast to that approach, the techniques discussed herein may use cameras and other sensors to view a portion or all of a physical environment in order to assess the physical objects within that environment so that the connection strength at a particular location may be approximately determined based on the properties of the physical objects and how they affect propagating signals.

Turning now to FIG. 1, a block diagram of an example environment 100 in which a user 105 resides is shown. In the illustrated embodiment, environment 100 includes a user 105 that is presenting device 110 that is in wireless communication with a base station 120. As further shown, presenting device 110 presents an XR view 115 to user 105 that identifies a strong connection area 130, a poor connection area 140, and an unsecure area 150. In some embodiments, environment 100 may be implemented differently than shown. As an example, environment 100 may include additional physical objects such as walls, tables, etc.

Environment 100, in various embodiments, is a physical environment that user 105 can sense and interact with without the aid of presenting device 110. Environment 100 may correspond to any of a variety of different physical environments such a living room, an office space, a museum exhibit, a park, etc. Environment 100 may include any of a variety of physical objects such as couches, tables, televisions, statues, animals, trees, benches, etc. When providing an XR-based experience to user 105, in some embodiments, presenting device 110 incorporates aspects of environment 100, such as its physical objects, into that experience. As an example, when providing an AR experience to user 105, presenting device 110 may capture images of environment 100 and then augment the images with virtual objects before displaying them to user 105. As explained below, when providing an XR-based experience to user 105, presenting device 110 may communicate with base station 120. However, when communicating wirelessly with base station 120, the physical objects of environment 100 may cause interference with that communication that results in degradation of the experience being provided by presenting device 110.

Presenting device 110, in various embodiments, is a computing device configured to display content to user 105 such as an XR view 115. In some embodiments, presenting device 110 is a head-mounted display (HMD) such as a headset, a helmet, goggles, glasses, a phone inserted into an enclosure, etc. worn on the head of user 105. In other embodiments, different devices, such as projection-based systems, displays formed as lenses designed to be placed on a user's eyes (e.g., similar to contact lenses), etc. may be used to implement the features described for presenting device 110. In some embodiments, presenting device 110 is another form of wearable device such as a watch, armband, bracelet, headphones, etc. In some embodiments, presenting device 110 is headphones/earphones, speaker arrays, input systems, smartphones, tablets, and desktop/laptop computers. In various embodiments, presenting device 110 includes wireless communications technology, such as Bluetooth technology, that allows presenting device 110 to communicate and exchange data with various systems including base station 120. In various cases, presenting device 110 may use the wireless communications technology as part of providing an XR experience in which base station 120 assists in producing XR views 115. In some embodiments, however, a wired connection may be used between presenting device 110 and base station 120.

In various embodiments, presenting device 110 is configured to provide any of various experiences to user 105. Such experiences may include XR-based experiences. For example, presenting device 110 may provide co-presence experiences in which multiple users may personally connect in an XR environment. As used herein, the term "co-presence" refers to a shared XR experience where two or more people can interact with one another using their respective presenting device 110s. As another example, presenting device 110 may provide gaming experiences in which a user performs activities in a VR environment. presenting device 110 may also provide non-XR-based experiences. For example, a user may use presenting device 110 to stream media content such as music or movies, which may be displayed in three or two dimensions. To facilitate delivery of these various experiences, presenting device 110 may employ the use of different sensors that include world sensors and user sensors, which are described in greater detail with respect to FIG. 2.

Base station 120, in various embodiments, is a computing device that is configured to assist in producing content used by presenting device 110 such as facilitating the rendering of XR views 115. Base station 120 may be or may include any type of computing device such as a desktop computer, a laptop, a phone, a tablet, etc. For example, base station 120 may be a user's phone whose compute ability may be leveraged by presenting device 110 to generate frames that when rendered by presenting device 110 produce XR views 115. In various embodiments, base station 120 includes one or more of various types of processors (e.g., SOCs, CPUs, GPUs, and/or other components) and memory configured to store software (e.g., one or more VR applications) that is executable by the processors, as well as data that may be used by the software when executing on base station 120. Base station 120 may execute a VR application that is capable of providing an XR experience in a virtual world for user 105. During execution of the VR application, base station 120 may generate frames of virtual content for the XR experience. Consequently, base station 120 may send the frames to presenting device 110 for processing and display to provide an XR view 115 of the virtual world to user 105. In various embodiments, presenting device 110 can interface with multiple base stations 120 when producing content and each of the base stations 120 may have different processing capabilities. As an example, one base station 120 might be a gaming console while another base station 120 might be a smartwatch worn by user 105. Base station 120 may also interface with multiple presenting devices 110—e.g., if there are multiple users 105 in environment 100 that are each using a presenting device 110.

In some embodiments, base station 120 is a communication node that does not actively assist in producing content for rendering GCR views 115. For example, base station 120 may be a network router or other access point device that facilitates communication between presenting device 110 and other computing devices, such as another presenting device 110 that is being used by another user who is in a different environment 100. Accordingly, base station 120 may facilitate the delivery of audio frames, video frames, and other information to presenting device 110 for rendering XR views 115.

In the illustrated embodiment, base station 120 is located near the front of environment 100 while presenting device 110 is located on user 105 near the back of environment 100. In between base station 120 and presenting device 110 is a set of physical objects that include a couch and a coffee table in the illustrated embodiment. As a result of the locations of presenting device 110, base station 120, and the set of physical objects in environment 100, a strong connection area 130 and a poor connection area 140 occur in the illustrated embodiment. A strong connection area 130 may correspond to an area where presenting device 110 can be placed to provide presenting device 110 with a connection quality to base station 120 that satisfies (i.e., meets or exceeds) a specified threshold. For example, a particular XR experience may require a certain amount of network bandwidth to be actualized. As such, strong connection area 130 may be an area where presenting device 110 can be placed to achieve (meet or exceed) that amount of network bandwidth. In contrast, a poor connection area 140 may be an area where presenting device 110 does not achieve a connection quality that satisfies a specified threshold if presenting device 110 is located there. As discussed throughout the present disclosure, connection scores may be calculated for different areas within environment 100. There may be a range of scores and, as a result, a range of areas with different connection qualities. These different areas may be presented differently to user 105 so that user 105 might choose between them. As an example, there may be two areas that are considered strong connection areas 130, but one of them may have a better connection quality. Consequently, the "better" area may be presented with more vibrant colors than the other area, for example.

An unsecure area 150 also occurs in the illustrated embodiment. An unsecure area 150 may correspond to an area that is identified as potentially being problematic to the experience in which user 105 is engaged, but not in reference to connection quality. For example, if a user is conducting a business meeting, unsecure area 150 may be an area next to an open window within environment 100. Standing next to the open window, user 105's conversation may be overheard by others, which may be undesired by user 105. As a result, unsecure area 150 may correspond to the area next to the open window that user 105 may wish to avoid.

In order to identify areas 130, 140, and 150, in various embodiments, presenting device 110 collects various types of information, which may include network information (e.g., information about channel congestion, received signal strength indicators (RSSIs), latency, throughput, etc.), visual information, and audio information. For example, presenting device 110 may identify the physical objects in environment 100 so that it may determine how much those objects affect the network connection between presenting device 110 and base station 120. As discussed in greater detail with respect to FIG. 2, presenting device 110 may include various types of sensors, such as one or more visible-light cameras that can capture video information of environment 100.

Using the information collected for environment 100, in various embodiments, presenting device 110 calculates (with the assistance of base station 120 in some instances) connection scores for different areas within environment 100. For example, presenting device 110 may determine that there is a couch between presenting device 110 and base station 120 as shown in the illustrated embodiment. presenting device 110 may further determine that the couch is made of a material that reasonably weakens signals that propagate through the couch. Accordingly, presenting device 110 may assign a lower score to an area where signals have to propagate through the couch to reach the base station 120 and vice versa to reach presenting device 110. As a result, presenting device 110 may determine strong connection area 130 and poor connection area 140 shown in the illustrated embodiment.

After calculating connection scores for different areas, in various embodiments, presenting device 110 provides an indication of those scores to user 105. For example, presenting device 110 may provide a visual indication such as a green floating orb in XR view 115 for strong connection area 130 and a red floating orb for poor connection 140. In response to being presented these indications, user 105 may decide to move to strong connection area 130. In some instances, presenting device 110 may provide a route that enables user 105 to move to a designated area, such as a strong connection area 130, without interacting with the physical objects of environment 100 in an undesired way (e.g., moving into the couch).

Figure 2:
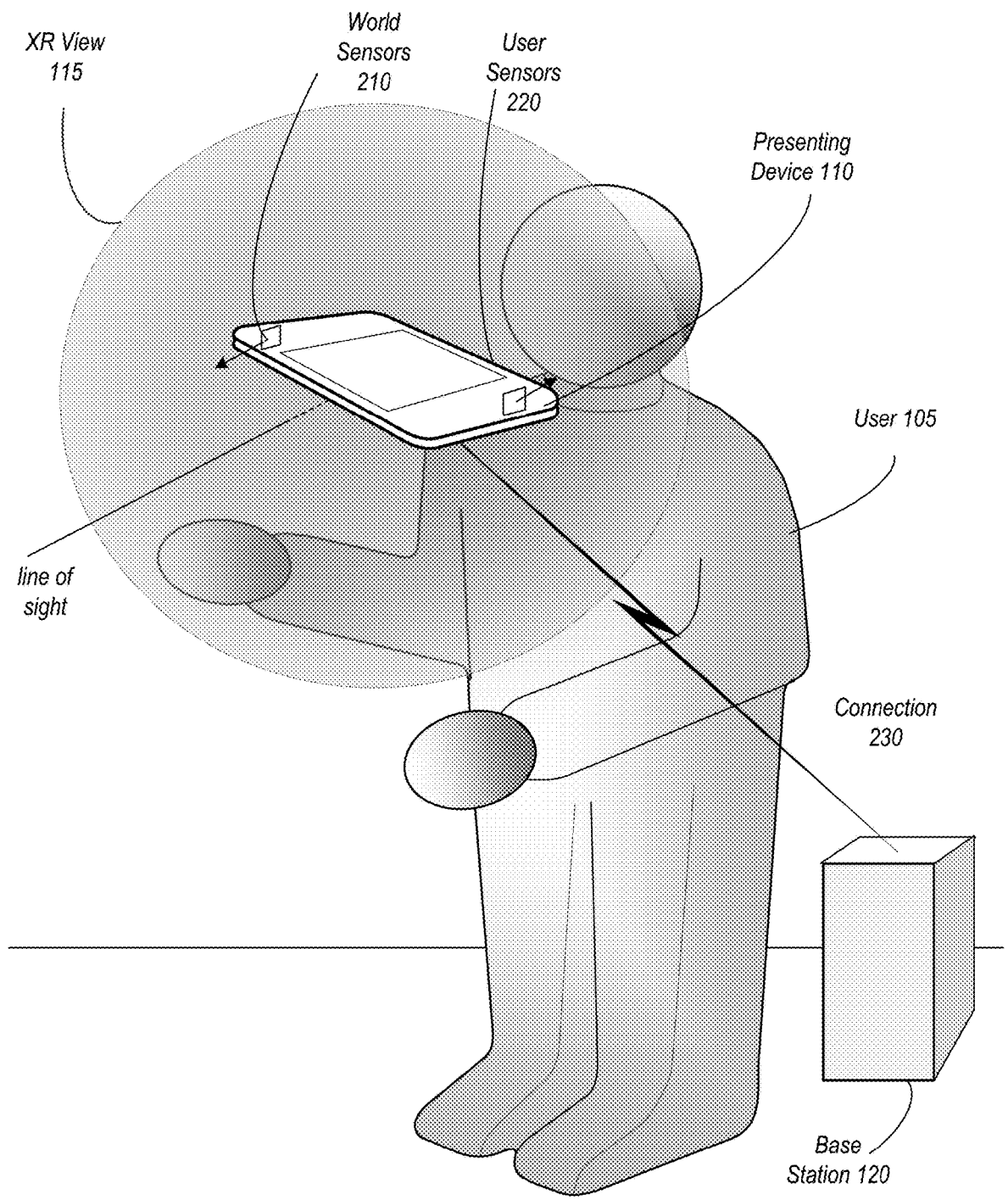
FIG. 2 is a block diagram illustrating example elements of an XR-capable system that includes a base station and a computing device having various sensors, according to some embodiments.

Turning now to FIG. 2, a block diagram of example sensors that are included in presenting device 110 is shown. In the illustrated embodiment, presenting device 110 includes world sensors 210 and user sensors 220 that can assist in rendering an XR view 115. Also, as shown, presenting device 110 and base station 120 are in wireless communication via a connection 230. In some embodiments, presenting device 110 may be implemented differently than shown. For example, presenting device 110 may not include user sensors 220.

World sensors 210, in various embodiments, are sensors configured to collect various information about environment 100 in which user 105 wears presenting device 110. In some embodiments, world sensors 210 include one or more visible-light cameras that capture video information of environment 100. This information may be used to provide a virtual view of environment 100, detect physical objects and surfaces in environment 100, provide depth information for objects and surfaces in environment 100, provide position (e.g., location and orientation) and motion (e.g., direction and velocity) information for user 105 in environment 100, etc. presenting device 110 may include left and right cameras that are located on a front surface of presenting device 110 at positions that are substantially in front of each of user 105's eyes. In yet other embodiments, more or fewer cameras may be used in presenting device 110 and may be positioned at other locations.

In some embodiments, world sensors 210 include one or more world mapping sensors (e.g., infrared (IR) sensors with an IR illumination source, or Light Detection and Ranging (LIDAR) emitters and receivers/detectors) that capture depth or range information for physical objects and surfaces in environment 100. This range information may be used in conjunction with frames captured by cameras to detect and recognize objects and surfaces in the real-world environment, and to determine locations, distances, and velocities of the objects and surfaces with respect to user 105's current position and motion. The range information may also be used in positioning virtual representations of physical objects that are to be composited into a virtual environment at correct depths. In various embodiments, the range information may be used in detecting the possibility of collisions with real-world objects and surfaces to redirect a user's walking. In some embodiments, world sensors 210 may include one or more light sensors (e.g., on the front and top of presenting device 110) that capture lighting information (e.g., direction, color, and intensity) in environment 100. This information may be used to alter the brightness and/or the color of the display system in presenting device 110.

User sensors 220, in various embodiments, are sensors configured to collect various information about user 105 using presenting device 110. In some embodiments, user sensors 220 may include one or more head pose sensors (e.g., IR or RGB cameras) that may capture information about the position and/or motion of user 105 and/or user 105's head. The information collected by head pose sensors may be used in determining how to render and display GCR views 115 of the virtual environment and content within those views. As an example, different views 115 of the environment may be rendered based at least in part on the position of user 105's head, whether user 105 is currently walking through the environment, and so on. As another example, the augmented position and/or motion information may be used to composite virtual content into the scene in a fixed position relative to the background view of the environment. In some embodiments, there may be two head pose sensors located on a front or top surface of the presenting device 110; however, in other embodiments, more (or fewer) head-pose sensors may be used and may be positioned at other locations.

In various embodiments, presenting device 110 includes one or network interfaces for establishing a network connection 230 with base station 120. Network connection 230 may be established using any suitable network communication protocol including wireless protocols such as Wi-Fi®, Bluetooth®, Long-Term Evolution™, etc. or wired protocols such as Ethernet, Fibre Channel, Universal Serial Bus™ (USB), etc. In some embodiments, network connection 230 may be implemented according to a proprietary wireless communications technology (e.g., 60 gigahertz (GHz) wireless technology) that provides a highly directional wireless link between the presenting device 110 and base station 120. In some embodiments, presenting device 110 is configured to select between different available network interfaces based on connectivity of the interfaces as well as the particular user experience being delivered by presenting device 110. For example, if a particular user experience requires a high amount of bandwidth, presenting device 110 may select a radio supporting the proprietary wireless technology when communicating wirelessly with base station 120. If, however, a user is merely streaming a movie from base station 120, Wi-Fi® may be sufficient and selected by presenting device 110. In some embodiments, presenting device 110 uses a form of compression to communicate over network connection 230 in instances, for example, in which bandwidth is limited.

presenting device 110 may transmit at least some of the information collected by sensors 210 and 220 to base station 120 via connection 230. Base station 120 may render VR frames based on the various information obtained from sensors 210 and 250, compress the frames, and transmit them to presenting device 110 via connection 230 for display to user 105. Those frames may be displayed by presenting device 110 to user 105 in order to facilitate the presentation of an XR view 115. In other cases, presenting device 110 may process the collected information locally to produce frames without the assistance of base station 120. In various embodiments, virtual representations of real-world objects detected by world sensors 210 may be overlaid on or composited in an XR view 115 provided by presenting device 110.

Figure 3:
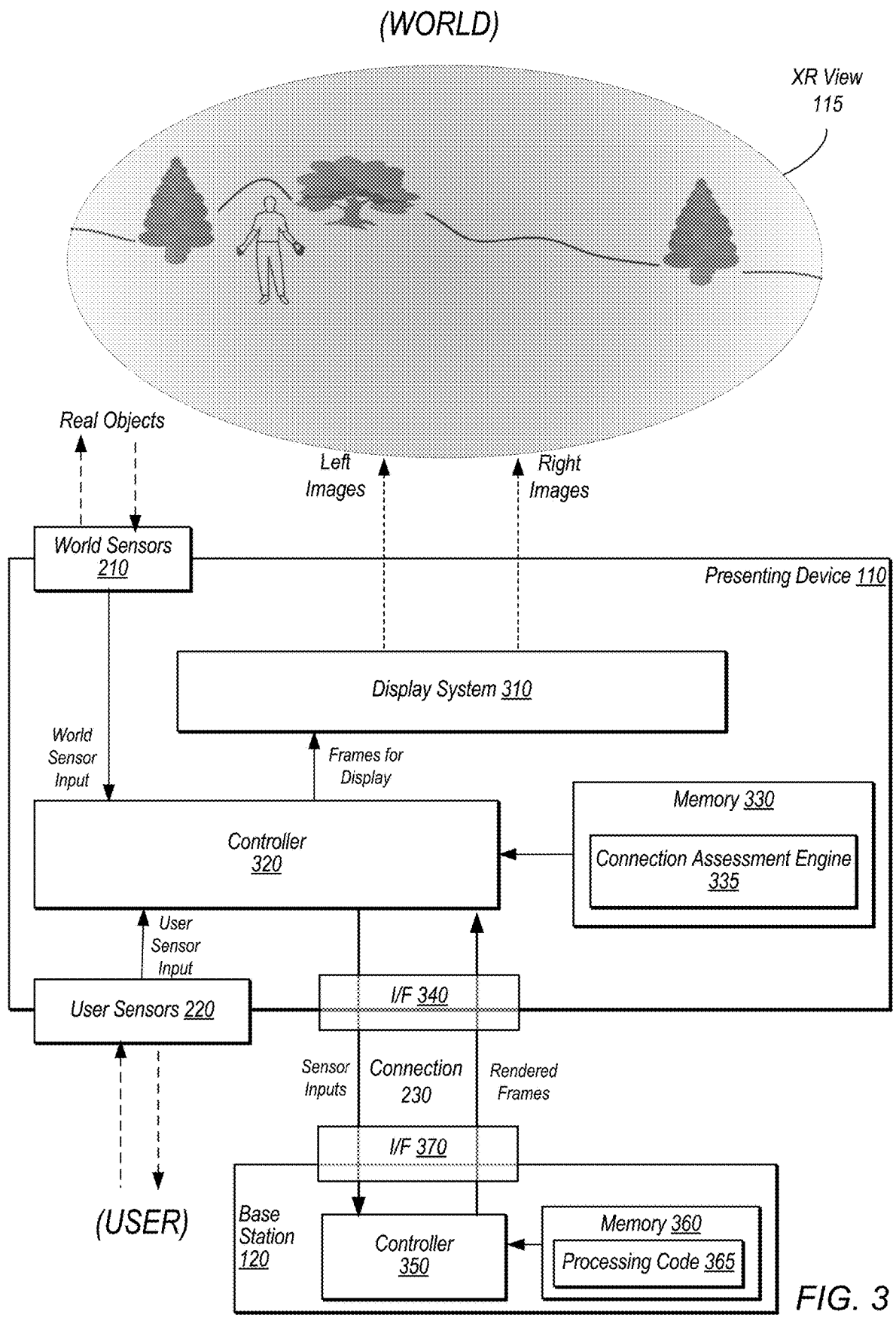
FIG. 3 is a block diagram illustrating example elements of components that are included in an XR-capable system, according to some embodiments.

Turning now to FIG. 3, a block diagram of example components within presenting device 110 and base station 120 is shown. In the illustrated embodiment, presenting device 110 includes a display system 310, a controller 320, memory 330, and a network interface 340 in addition to world sensors 210 and user sensors 220 discussed above. As illustrated, base station 120 includes a controller 350, memory 360, and network interface 370. In some embodiments, presenting device 110 and/or base station 120 may be implemented differently than shown. For example, presenting device 110 may not include user sensors 220.

Display system 310, in various embodiments, is configured to display rendered frames to a user. Display system 310 may implement any of various types of display technologies that include, for example, near-eye displays that present left and right images to create the effect of three-dimensional view (e.g., an XR view 115). In various embodiments, near-eye displays may use digital light processing (DLP), liquid crystal display (LCD), liquid crystal on silicon (LCoS), or light-emitting diode (LED). As another example, display system 310 may include a direct retinal projector that scans frames including left and right images, pixel by pixel, directly to the user 105's eyes via a reflective surface (e.g., reflective eyeglass lenses). To create a three-dimensional effect in XR view 115, objects at different depths or distances in the two images are shifted left or right as a function of the triangulation of distance, with nearer objects shifted more than more distant objects. Display system 310 may further support any medium such as an optical waveguide, a hologram medium, an optical combiner, an optical reflector, or any combination thereof. In some embodiments, display system 310 may be the transparent or translucent and be configured to become opaque selectively.

Controller 320, in various embodiments, includes circuitry that is configured to facilitate operation of presenting device 110. Accordingly, controller 320 may include one or more processors that are configured to execute program instructions, such as connection assessment engine 335, to cause presenting device 110 to perform various operations described herein.

These processors may be CPUs configured to implement any suitable instruction set architecture, and may be configured to execute instructions defined in that instruction set architecture. For example, controller 320 may include general-purpose or embedded processors that implement any of a variety of instruction set architectures (ISAs), such as ARM, x86, PowerPC, SPARC, RISC, or MIPS ISAs, or any other suitable ISA. In multiprocessor systems, each of these processors might commonly, but not necessarily, implement the same ISA. Controller 320 may employ any microarchitecture, including scalar, superscalar, pipelined, superpipelined, out of order, in order, speculative, non-speculative, etc., or combinations thereof. Controller 320 may include circuitry to implement microcoding techniques. Controller 320 may include one or more levels of caches, which may employ any size and any configuration (set associative, direct mapped, etc.). In some embodiments, controller 320 may include at least GPU, which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 320 may include one or more other components for processing and rendering video and/or images, for example image signal processors (ISPs), coder/decoders (codecs), etc. In some embodiments, controller 320 may be implemented as a system on a chip (SOC). As discussed, presenting device 110 may include world sensors 210 that collect information about user 105's environment (video, depth information, lighting information, etc.), and user sensors 220 that collect information about user 105 (e.g., the user's expressions, eye movement, etc.). Sensors 210 and 220 may provide the collected information to controller 320 of presenting device 110 for processing.

Memory 330, in various embodiments, is configured to store program instructions (e.g., that implement connection assessment engine 335) and data that is processable by processors in controller 320. Memory 330 may include any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. Memory 330 may also be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Network interface 340, in various embodiments, includes one or more interfaces that are configured to communicate with external entities such as base station 120. As noted above, network interface 340 may support any suitable wireless technology such as WiFi®, Bluetooth®, Long-Term Evolution™, etc. or any suitable wired technology such as Ethernet, Fibre Channel, Universal Serial Bus™ (USB) etc. In some embodiments, interface 340 may implement a proprietary wireless communications technology (e.g., 60 gigahertz (GHz) wireless technology) that provides a highly directional wireless connection 230 between the presenting device 110 and base station 120. Network interface 340 can be configured to communicate with base station 120 via connection 230 to send sensor inputs to base station 120 and receive rendered frames from base station 120.

Controller 350, in various embodiments, includes circuitry that is configured to facilitate operation of base station 120. Controller 350 may implement any of the functionality described above with respect to controller 320. As an example, controller 350 may include one or more processors configured to execute program instructions to cause base station 120 to perform various operations described herein such as processing code 365 to generate frames associated with an XR view 115. Processing Code 365 may include one or more VR applications.

Memory 360, in various embodiments, is configured to store data and program instructions executable by processors in controller 350. Memory 360 may include any suitable volatile memory and/or non-volatile memory such as those noted above with memory 330. Memory 360 may be implemented in any suitable configuration such as those noted above with memory 330.

Network interface 370, in various embodiments, includes one or more interfaces that are configured to communicate with external entities such as presenting device 110 as well as other base stations 120. Network interface 37 may also implement any of suitable technology such as those noted above with respect to network interface 340.

Figure 4:
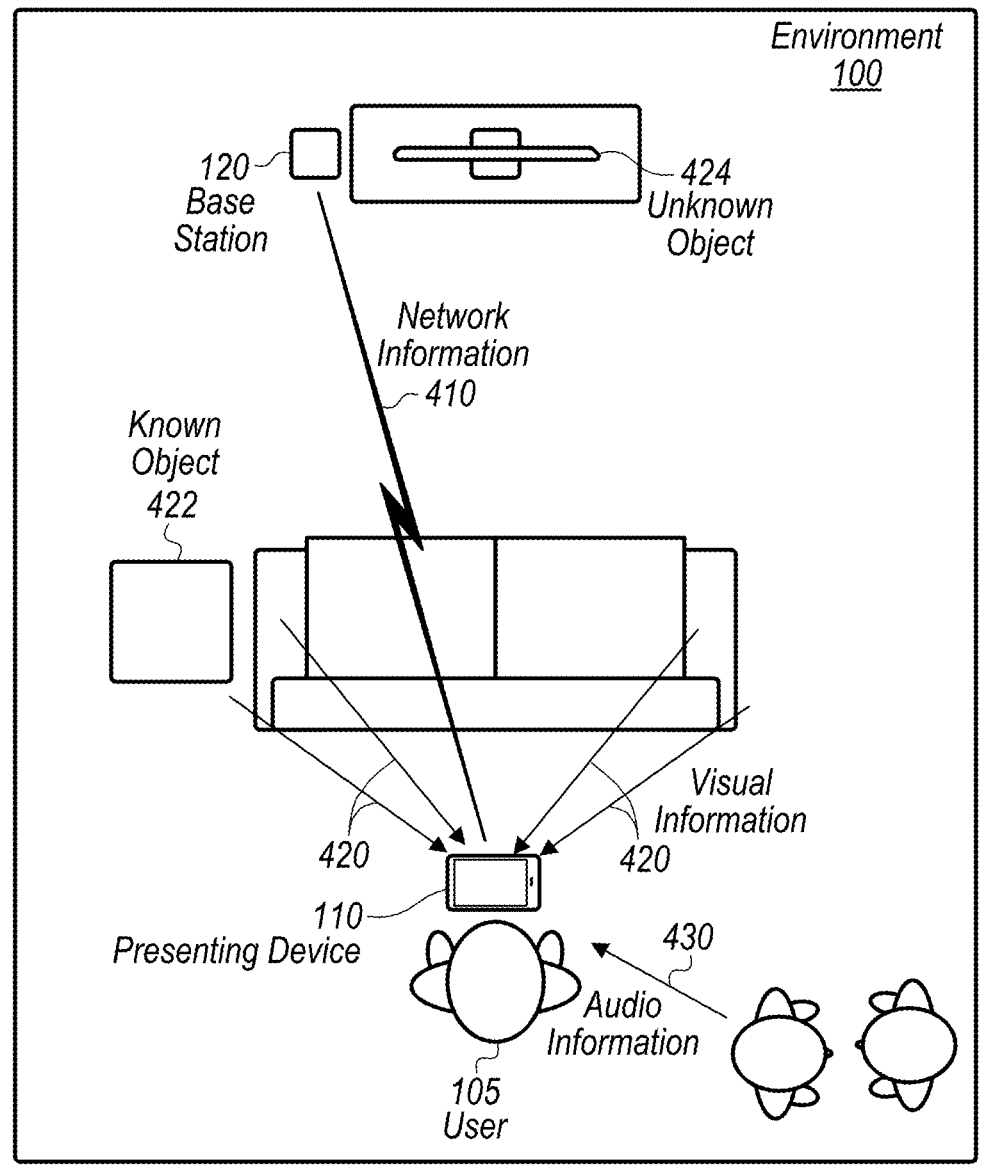
FIG. 4 is a block diagram illustrating example elements of environment information that may be collected by a computing device, according to some embodiments.

Turning now to FIG. 4, a block diagram of example environment information received by presenting device 110 is shown. In the illustrated embodiment, environment 100 includes user 105 who is wearing presenting device 110, base station 120, a known object 422, and an unknown object 424. Also, as illustrated, presenting device 110 receives network information 410, visual information 420, and audio information 430. In some embodiments, environment 100 may be different than shown. As an example, environment 100 may include different objects 422 and 424, such as shelves, trees, benches, etc.

As discussed, presenting device 110 may include various sensors that enable presenting device 110 to capture different types of information about environment 100. This information may be used by presenting device 110 (and base station 120 when assisting presenting device 110) to determine strong connection areas 130 that are favorable for experiencing XR experiences and poor connection areas 140 that should be avoided during XR experiences.

Network information 410, in various embodiments, includes information that identifies the radio signal strength between presenting device 110 and base station 120 at different physical locations within environment 100. Network information 410 may be captured by a set of network circuits of presenting device 110 that measure the power level of the network signals that presenting device 110 receives from base station 120. The radio signal strength may be recorded in decibel milliwatts. For example, network information 410 might indicate that the radio signal strength between presenting device 110 and base station 120 is proximately −70 dBm when presenting device 110 is located behind the couch (shown in the illustrated embodiment) and −50 dBm when presenting device 110 is in front of that couch. To collect network information 410, user 105 may move presenting device 110 to different locations in environment 100 so that presenting device 110 may measure the power level of the network signals between presenting device 110 and base station 120 at those locations. In some embodiments, network information 410 may be used to establish a basis approximation of the connection strength for different locations in environment 100. This approximation may be extrapolated to other locations based on an assessment of the physical objects in environment 100 that are identified using visual information 420. Network information 410 may include additional information that identifies the channel congestion, the latency, and the throughput of the connection of presenting device 110 to base station 120.

Visual information 420, in various embodiments, includes information that provides a visual representation of the physical layout and/or physical objects in environment 100. Visual information 420 may be captured by one or more world sensors 210 that detect physical objects and surfaces in environment 100 and provide depth information for those objects and surfaces in environment 100. For example, visual information 420 may include depth/range information captured by infrared (IR) sensors with an IR illumination source and video frames captured by cameras. That depth/range information may be used in conjunction with those video frames to detect and recognize objects and surfaces in environment 100. For example, objects identified within the video frames may be compared against a catalog of known objects 422 to determine if any of those identified objects are known. Accordingly, in various embodiments, presenting device 110 (and base station 120 when assisting presenting device 110) uses visual information 420 to identify known objects 422 (e.g., objects found within a catalog) and unknown objects 424.

Audio information 430, in various embodiments, includes information pertaining to the sounds that occur within environment 100. Audio information 430 may be captured by a set of microphones of presenting device 110 that measure the sounds propagating through environment 100. For example, as shown at the lower right of the illustrated embodiment, two individuals are having a conversation. The sounds from their conversation may propagate such that the microphones of presenting device 110 detect those sounds and measure their originating direction. Accordingly, audio information 430 may indicate those sounds (e.g., the strength of those sounds in decibels) and where they are originating from. In various embodiments, audio information 430 may be used to determine unsecure areas 150 within environment 100. As an example, if audio information 430 is indicative that there are human sounds originating from a particular location, then presenting device 110 might indicate that location as an unsecure area 150 to user 105 so that user 105 can avoid that location if user 105 is having, e.g., a confidential call.

Figure 5:
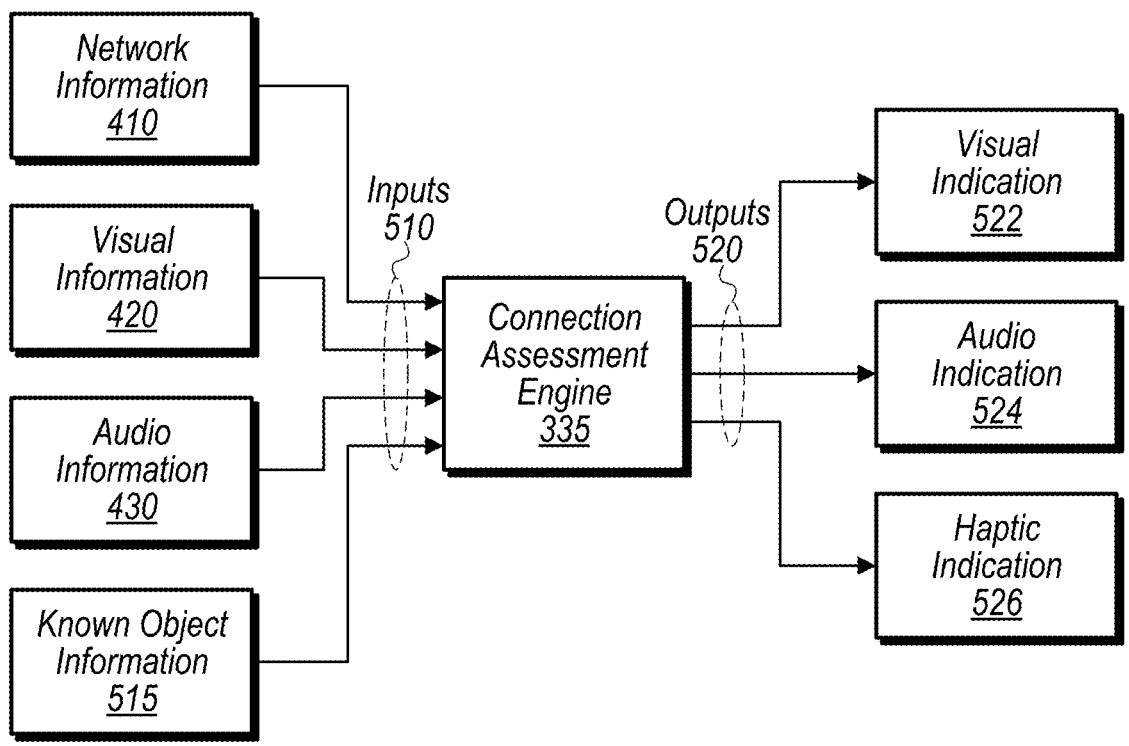
FIG. 5 is a block diagram illustrating example elements of a connection assessment engine, according to some embodiments.

Turning now to FIG. 5, a block diagram of an example connection assessment engine 335 is shown. In the illustrated embodiment, connection assessment engine 335 receives four inputs 510 and produces three outputs 520. As shown, inputs 510 include network information 410, visual information 420, audio information 430, and known object information 515, and outputs 520 include visual indication 522, audio indication 524, and haptic indication 526. In some embodiments, inputs 510 and output 520 may be different than shown. As an example, connection assessment engine 335 may not receive audio information 430 as an input 510.

Connection assessment engine 335, in various embodiments, is a collection of software routines executable to identify strong connection areas 130, poor connection areas 140, and/or unsecure areas 150 in environment 100. In order to identify those different areas, connection assessment engine 335 may calculate scores for various locations in environment 100 and based on those scores falling within defined ranges, those locations may be classified as strong connection areas 130 or poor connection areas 140. Connection assessment engine 335 may separately determine whether to classify a particular location as an unsecure area 150.

To calculate scores for different locations in environment 100, in some embodiments, connection assessment engine 335 initially captures environment information for environment 100, such as visual information 420 and audio information 430. Connection assessment engine 335 may also capture network information 410. In addition to capturing information pertaining to environment 100, in some embodiments, connection assessment engine 335 retrieves known object information 515 from a local or external database—e.g., known object information 515 may be maintained by a third-party. Known object information 515, in various embodiments, includes information that identifies a list of known objects 422 and particular properties about those objects (e.g., the material that they are made of). For example, known object information 515 may include a catalog of chairs that are sold by retailers. The catalog may identify whether a particular chair is made of wood, leather, plastic, etc. In various embodiments, known object information 515 may further include information that provides an indication of the interference caused by particular materials. For example, known object information 515 may indicate that a brick can cause an attenuation of −15 dBm to a 5 GHz signal.

After capturing environment information about environment 100 and retrieving known object information 515, in various embodiments, connection assessment engine 335 calculates scores for different locations in environment 100. To calculate a score for a particular location, connection assessment engine 335 may determine whether there are physical objects between that particular location and base station 120. In some cases, connection assessment engine 335 analyzes images of environment 100 (that are included in visual information 420) using, e.g., a set of trained machine learning models. If connection assessment engine 335 determines that there exists a physical object between the particular location and base station 120, connection assessment engine 335 may determine whether the physical object is a known object 422 or an unknown object 424. In order to make that determination, in some embodiments, connection assessment engine 335 examines images of the physical object and images of known objects 422 (that may be included in known object information 515) to determine if the physical object matches any known object 422.

If a physical object is a known object 422, then connection assessment engine 335 may look up properties of that object (e.g., its material) and based on those properties, determine an amount of interference caused by that physical object. As an example, connection assessment engine 335 may determine that the physical object corresponds to a certain chair that is made of wood that causes an approximate amount of attenuation to signals transmitted by presenting device 110 and base station 120. In various instances, if a physical object is an unknown object 424, then connection assessment engine 335 may attempt to determine what material that object is made of. As an example, presenting device 110 may include world sensors 210 (e.g., lasers) that can be used to measure a refractive index or thermal conductivity of a physical object. Based on the refractive index or thermal conductivity, connection assessment engine 335 may determine the material of a physical object. Connection assessment engine 335 may then retrieve information about that material (e.g., information describing an amount of attenuation caused by that material) as discussed.

Based on the determined amount of interference caused by the physical objects that are situated between a particular location and base station 120, connection assessment engine 335 may assign a score to that particular location. If the signals transmitted between presenting device 110 and base station 120 are expected to be reasonably attenuated at a certain location, then connection assessment engine 335 may assign a lower score; otherwise, a higher score may be assigned to that location. In some cases, if network information 410 indicates a radio signal strength for a location that is within a predefined distance from a particular location that is being assessed, then connection assessment engine 335 may calculate a radio signal strength for the particular location by extrapolating the radio signal strength from the other location. In various instances, connection assessment engine 335 may adjust the radio signal strength based on the amount of attenuation that was estimated to be caused by physical objects between the particular location and base station 120. Connection assessment engine 335 may then calculate a score based on the adjusted radio signal strength.

After calculating scores for locations within environment 100, in various embodiments, connection assessment engine 335 determine if those locations are strong connection areas 130 and poor connection areas 140. In some cases, score ranges may be specified for each type of area. Accordingly, if a calculated score falls within a particular score range, then the associated location may be classified as the corresponding area. In some embodiments, after determining strong connection areas 130 and poor connection areas 140, connection assessment engine 335 may generate visual indications 522, audio indications 524, and/or haptic indications 526 and present them to user 105 in order to guide user 105 to towards or from particular areas. These indications are discussed in greater detail with respect to FIG. 6.

In some embodiments, information is stored at base station 120 that identifies the scores calculated by connection assessment engine 335 and the classifications of the various locations in environment 100. Accordingly, when a user 105 wearing a presenting device 110 enters environment 100, that presenting device 110 may retrieve the information from base station 120 so that it does not have to perform an assessment of environment 100. That is, one presenting device 110 may assess environment 100 to identify strong connection areas 130 and poor connection areas 140 and may share that assessment (e.g., in the form of a mapping) with other presenting device 110 directly or indirectly via base station 120. When a presenting device 110 retrieves an assessment of environment 100, it may reevaluate environment 100 to determine if the layout has changed. If the layout has not changed, then presenting device 110 may use the previous assessment; otherwise, presenting device 110 may update the assessment.

In addition to identifying strong and poor connection areas 130 and 140 in environment 100, connection assessment engine 335 may further identify unsecure areas 150 in environment 100 that user 105 might wish to avoid when engaging in an XR experience. As an example, if user 105 is conducting a co-presence business meeting, user 105 might not want other users to eavesdrop on the meeting. Accordingly, in some cases, connection assessment engine 335 may analyze visual information 420 and audio information 430 to identify areas where other users are present in environment 100. For example, if audio information 430 indicates that a group of individuals are talking in a corner of environment 100, then connection assessment engine 335 may classify that corner as an unsecure area 150 and provide an indication to user 105 to avoid that area while engaged in the co-presence business meeting. In some cases, connection assessment engine 335 may identify physical objects that could potentially hurt user 105 (e.g., a small box on the floor) and classify the areas that include those physical objects as unsecure areas 150.

Figure 6:
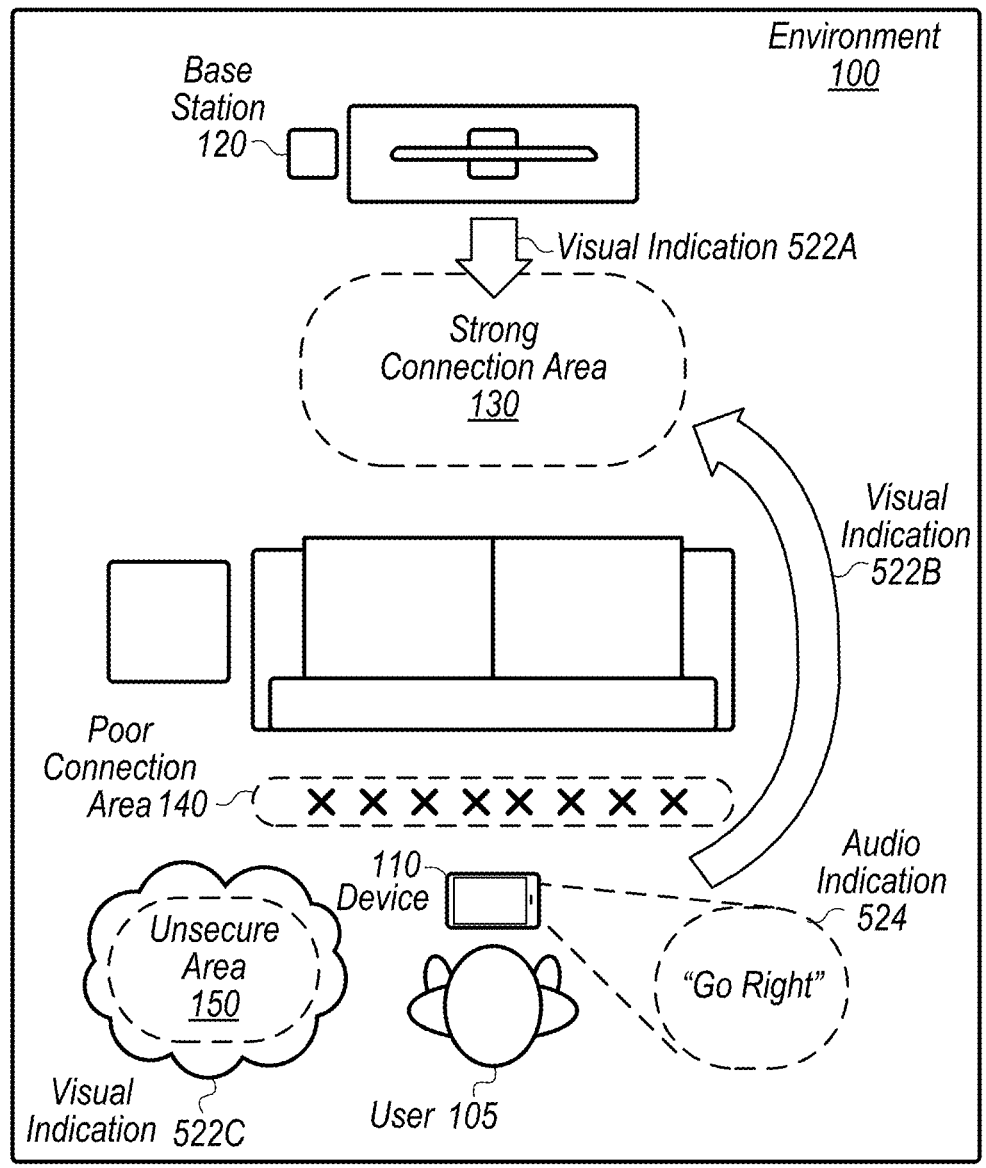
FIG. 6 is a block diagram illustrating example elements of outputs that can be produced by a computing device, according to some embodiments.

Turning now to FIG. 6, a block diagram of example outputs 520, which include visual indications 522A-C and audio indication 524, is shown. As discussed, presenting device 110 may generate and present indications 522, 524, and 526 to identify strong, poor, and unsecure areas 130, 140, and 150 to user 105. When presenting visual indications 522, presenting device 110 may augment a set of images of environment 100 (or a virtual environment) with a virtual visualization that identifies a particular area. As illustrated, visual indication 522A is an arrow that points down towards a strong connection area 130. Accordingly, when user 105 sees that arrow, user 105 may choose to move towards the arrow to reach the area in order to improve the connection quality between presenting device 110 and base station 120. In various cases, there may not be a straight path to a particular area such as strong connection area 130—i.e., there is a couch between user 105 and area 130. presenting device 110 may present a visual indication 522 that guides user 105 along a path. As illustrated, visual indication 522B is an arrow that curves around the couch towards area 130. User 105 may follow visual indication 522B so as to avoid running into the couch. Another example of a visual indication 522 is visual indication 522C, which is a visual of a cloud that surrounds unsecure area 150. Accordingly, when user 105 sees the clouded area, user 105 may choose to avoid that area. In various embodiment, presenting device 110 may provide an audio indication 524 to user 105. As depicted, for example, audio indication 524 corresponds to the phrase "Go Right" being spoken to user 105 via a speaker of presenting device 110. In various embodiments, presenting device 110 may provide a haptic indication 526 to guide user 105. As an example, presenting device 110 may vibrate the right side of user 105's head as indication that user 105 should move towards the right. In various embodiments, presenting device 110 may provide a combination of indications 622, 624, and 626, including other indications than the ones that are shown. For example, presenting device 110 may provide both visual indication 522B and audio indication 524 to user 105.

Figure 7:
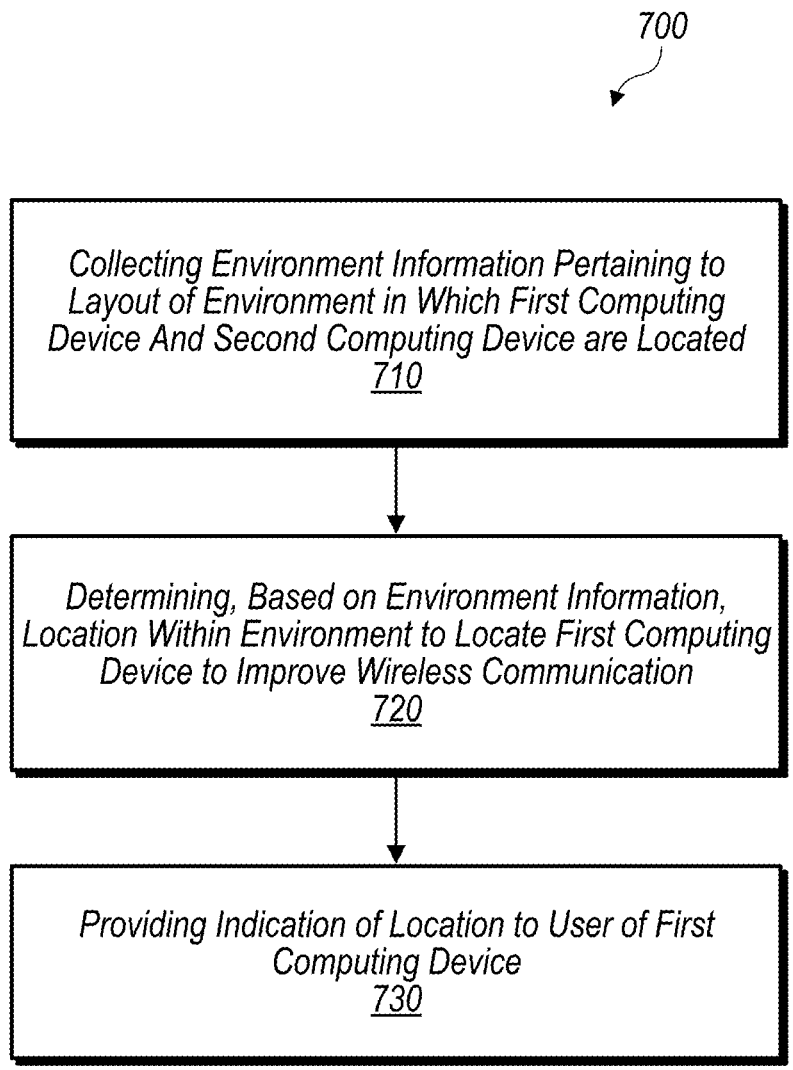
FIGS. 7-9 are flow diagrams illustrating example methods relating to identifying a location at which to locate/position a computing device, according to some embodiments.

Turning now to FIG. 7, a flow diagram of a method 700 is shown. Method 700 is one embodiment of a method performed by a first device (e.g., presenting device 110) in order to provide an indication (e.g., visual indication 522) of a location (e.g., strong connection area 130) where a user can locate the first computing device for improved connection quality with another computing device (e.g., base station 120), for example. Method 700 may be performed in response to the user beginning an XR experience, during an XR experience, when the user enters a room with the first computing device, etc. In some embodiments, method 700 may include additional steps than shown. For example, the first computing device may generate and share a mapping of an environment (e.g., environment 100) with another computing device (e.g., another presenting device 110) to enable the other device to determine a location in the environment at which it might be located to improve a wireless communication between it and the second computing device.

Method 700 begins in step 710 with the first computing device collecting environment information (e.g., network information 410, visual information 420, audio information 430, and known object information 515) pertaining to a layout of an environment (e.g., environment 100) in which the first computing device and the second computing device are located. The first computing device may be in wireless communication with the second computing device. In various embodiments, the first computing device collects visual information (e.g., visual information 420) from one or more cameras (e.g., world sensors 210) coupled to the first computing device. The visual information may include a plurality of images of the environment that are usable for identifying a set of physical objects (e.g., known object 422 and unknown object 424) within the environment that interfere with the wireless communication between the first computing device and the second computing device. In some cases, collecting the environment information is performed in response to determining a movement of the first computing device into the environment (e.g., a user walks into the environment while wearing the first computing device). In some embodiments, the first computing device collects part or all of the environment information by retrieving a previously generated mapping of the environment that identifies, for each of a set of locations within the environment, a connection quality of the wireless communication when the first computing device is physically located at that location.

In step 720, the first computing device determines, based on the environment information, a location (e.g., strong connection area 130) within the environment to locate the first computing device to improve the wireless communication between the first computing device and the second computing device. The first computing device may determine the location by generating a set of scores for a respective set of locations within the environment. The score for a given location may be indicative of a connection quality of the wireless communication when the first computing device is physically located at the given location. In various embodiments, the first computing device selects, based on the set of scores, the location from the set of locations. In some cases, the location may be selected based on a type of an experience (e.g., watching a movie, interacting in a virtual reality, etc.) to be provided to the user by the first computing device. The location may be selected such that connection quality at that location satisfies a minimum connection quality for providing the experience.

In some embodiments, the first computing device may determine the location by identifying, based on the environment information, a set of physical objects located within the environment. The first computing device may access, for each of the set of physical objects, property information that identifies a set of properties of that physical object that is usable to determine an amount of interference capable of being caused by that physical object to the wireless communication between the first computing device and the second computing device. The first computing device may then identify the location based on a determined amount of interference caused by the set of physical objects when the first computing device is located at the location.

In step 730, the first computing device provides an indication (e.g., indications 522, 524, and/or 526) of the location to a user of the first computing device. The first computing device, in various embodiments, is configured to produce images that present a mixed reality by augmenting images of the environment with virtual visualizations. Accordingly, the first computing device may provide the indication of the location by augmenting a set of images of the environment with a virtual visualization (e.g., indication 522A) identifying the location and causing a display of the first computing device to present the set of augmented images to the user. In some cases, the first computing device may provide the indication of the location by causing sound to be produced for directing a movement of the user to the location. The first computing device may also determine that another location within the environment is associated with a set of security hazards pertaining to a use of the first computing device at the other location. Accordingly, the first computing device may provide an indication of the other location to the user.

Figure 8:
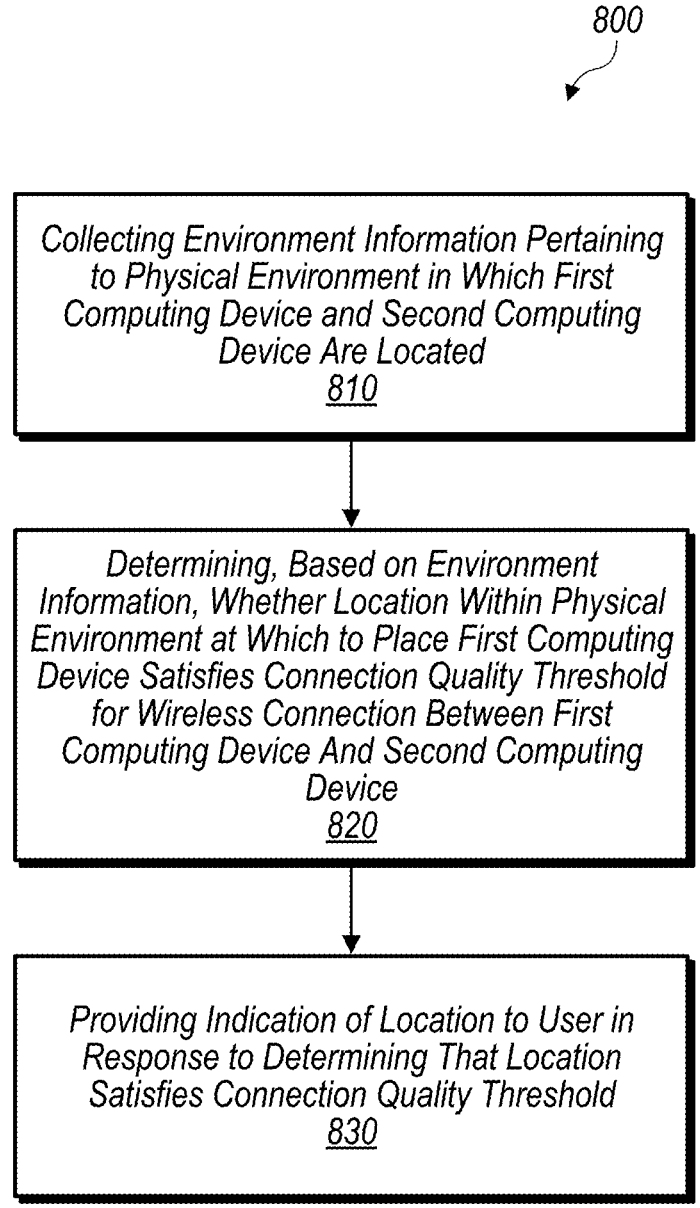

Turning now to FIG. 8, a flow diagram of a method 800 is shown. Method 800 is one embodiment of a method performed by a first computing device (e.g., presenting device 110) in order to provide an indication (e.g., visual indication 522) of a location (e.g., strong connection area 130) where a user can locate the first computing device for improved connection quality with another computing device (e.g., base station 120), for example. In some embodiments, method 800 may include additional steps than shown.

Method 800 begins in step 810 with the first computing device collecting environment information (e.g., network information 410, visual information 420, audio information 430, and known object information 515) pertaining to a physical environment in which the first computing device and the second computing device are located. In various embodiments, the first computing device includes one or more cameras (e.g., world sensors 210) configured to capture images of the physical environment. Accordingly, the first computing device may collect environment information by capturing a set of images of the physical environment using the one or more cameras.

In step 820, the first computing device determines, based on the environment information, whether a location within the physical environment at which to place the first computing device satisfies a connection quality threshold for the wireless connection between the first computing device and the second computing device. Such determining may include identifying one or more objects based on the set of images captured using the one or more cameras and estimating interferences to the wireless connection that would be caused by the one or more objects when the first computing device is placed at the location.

In step 830, the first computing device provides an indication of the location to a user in response to determining that the location satisfies the connection quality threshold. In various embodiments, the first computing device includes a head-mounted display (HMD) configured to present images of the physical environment to the user. Accordingly, the first computing device may provide the indication by augmenting a set of images of the physical environment to include a virtual element that indicates the location and causing the HMD to present the set of images to the user. In some embodiments, the first computing device includes one or more haptic-based sensors configured to provide haptic feedback. Accordingly, the first computing device may provide the indication by causing the one or more haptic-based sensors to provide haptic feedback indicating the location to the user.

Figure 9:
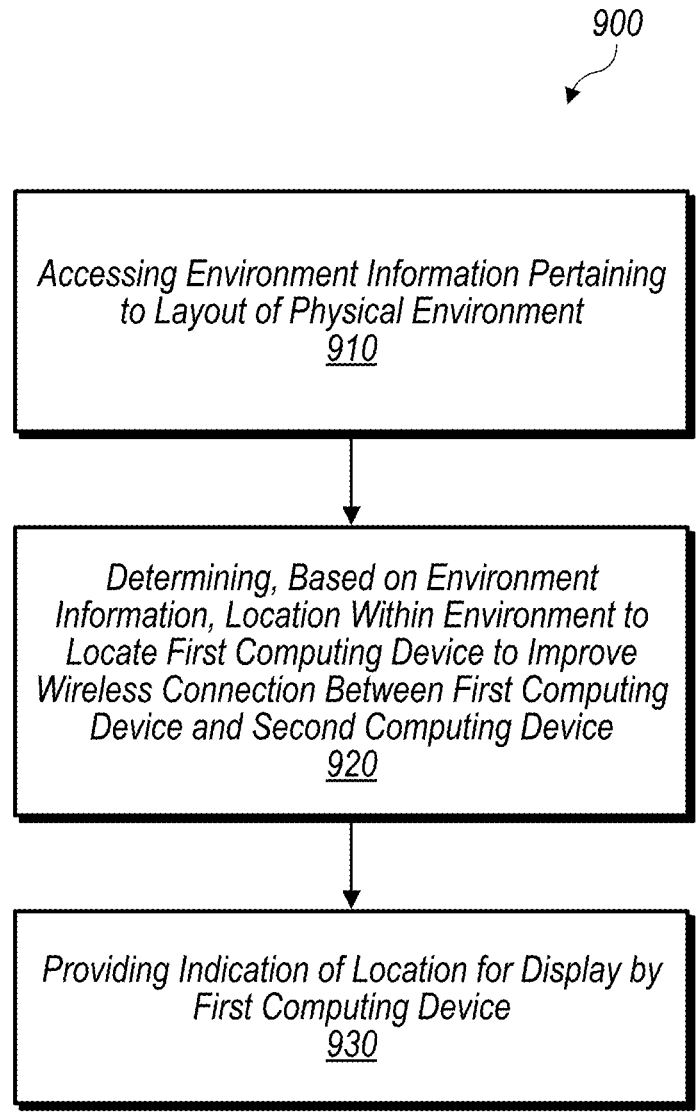

Turning now to FIG. 9, a flow diagram of a method 900 is shown. Method 900 is one embodiment of a method performed by a computer system (e.g., presenting device 110 or base station 120) in order to provide an indication of a location (e.g., strong connection area 130) where a user can locate a first computing device for improved connection quality with another computing device, for example. In some embodiments, method 900 may include more additional steps than shown.

Method 900 begins in step 910 with the computer system accessing environment information (e.g., network information 410, visual information 420, audio information 430, and known object information 515) pertaining to a layout of a physical environment (e.g., environment 100). The computer system may access the environment information by obtaining a set of images of the physical environment captured by one or more cameras of the first computing device.

In step 920, the computer system determines, based on the environment information, a location within the environment to locate a first computing device to improve a wireless connection between the first computing device and a second computing device. The computer system may determine the location by identifying, based on the set of images, one or more physical objects within the physical environment using a set of neural networks trained on a plurality of objects that include the one or more physical objects. The computer system further determines a set of effects on the wireless connection caused by the one or more identified physical objects. In step 930, the computer system provides an indication of the location for display by the first computing device.

Exemplary Computer System

Figure 10:
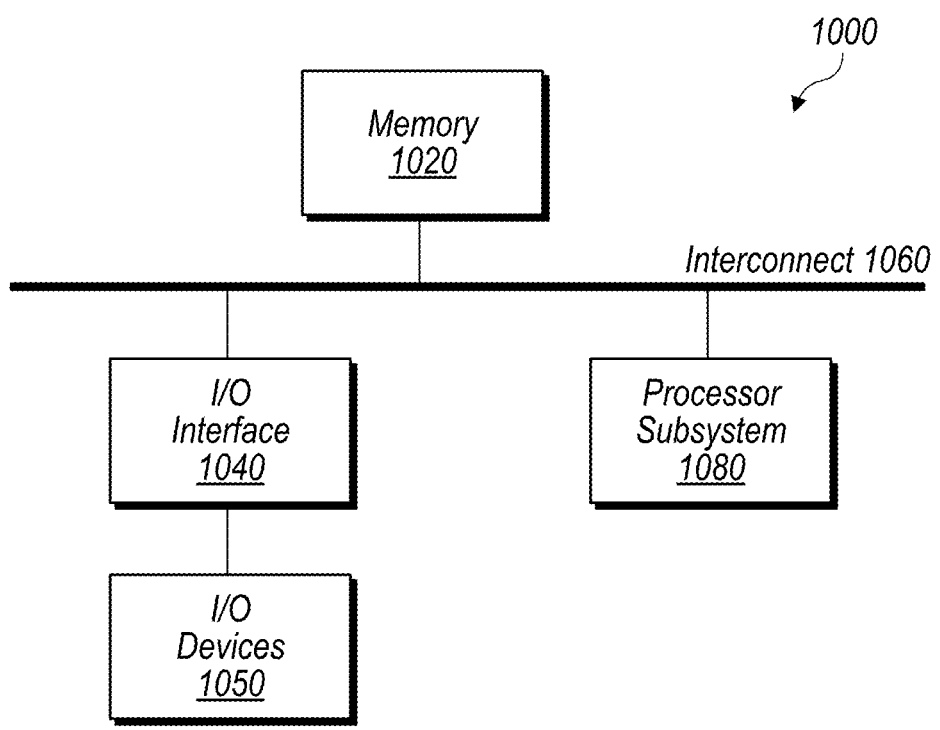
FIG. 10 is a block diagram illustrating an example computer system, according to some embodiments.

Turning now to FIG. 10, a block diagram of an exemplary computer system 1000, which may implement presenting device 110 and/or base station 120, is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080. In some embodiments, program instructions that when executed implement connection assessment engine 335 may be included/stored within system memory 1020.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over Wi-Fi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored thereon that are executable to cause a first computing device to perform operations comprising:
    collecting environment information pertaining to a layout of an environment in which the first computing device and a second computing device are located, wherein the first computing device is in wireless communication with the second computing device;
    determining, based on the environment information, a location within the environment to be provided to a user of the first computing device, wherein the determined location is a location to relocate the first computing device to improve the wireless communication such that the location corresponds to a connection quality to the second computing device that satisfies a particular threshold, and wherein determining the location includes:
        extrapolating a radio signal strength for the location from a radio signal strength at a current location of the first computing device within the environment; and
    providing, via a display of the first computing device, an indication of the determined location to the user of the first computing device.

2. The medium of claim 1, wherein collecting environment information includes:
    collecting visual information from one or more cameras coupled to the first computing device, wherein the visual information includes a plurality of images of the environment, and wherein the plurality of images is usable for identifying a set of physical objects within the environment that interfere with the wireless communication; and
    wherein the determining is performed as the first computing device moves through the environment.

3. The medium of claim 1, wherein the collecting is performed in response to determining a movement of the first computing device into the environment, and wherein the collecting includes:
    retrieving a previously generated mapping of the environment that identifies, for each of a set of locations within the environment, a connection quality of the wireless communication when the first computing device is physically located at that location.

4. The medium of claim 1, wherein determining the location includes:
    generating a set of scores for a respective set of locations within the environment, wherein a score in the set of scores for a given location is indicative of a connection quality of the wireless communication when the first computing device is physically located at the given location; and
    selecting, based on the set of scores, the location from the set of locations.

5. The medium of claim 4, wherein the location is selected based on a type of an experience to be provided to the user by the first computing device, wherein the type of the experience is associated with a minimum connection quality for providing the experience.

6. The medium of claim 4, further comprising:
    generating a mapping of the environment that identifies the set of scores for the respective set of locations; and
    sharing the generated mapping of the environment with another computing device to enable the other computing device to determine a location within the environment to locate the other computing device to improve the wireless communication between the other computing device and the second computing device.

7. The medium of claim 1, wherein determining the location includes:
    identifying, based on the environment information, a set of physical objects located within the environment;
    accessing, for each of the set of physical objects, property information that identifies a set of properties of that physical object that is usable to determine an amount of interference capable of being caused by that physical object to the wireless communication between the first computing device and the second computing device; and identifying the location based on a determined amount of interference caused by the set of physical objects when the first computing device is located at the location.

8. The medium of claim 1, further comprising:
determining that another location within the environment is associated with a set of security hazards pertaining to a use of the first computing device at the other location; and
providing an indication of the other location to the user.

9. The medium of claim 1, wherein the operations further comprise:
receiving, from the second computing device, assistance in rendering mixed reality content for presentation via the display of the first computing device, wherein the assistance includes receiving content included in one or more displayed frames.

10. The medium of claim 1, wherein providing the indication of the location includes providing multiple indications of multiple locations within the environment, wherein the multiple indications include an indication of a location of where not to relocate the first computing device.

11. A first computing device, comprising:
a network circuit configured to establish a wireless connection with a second computing device;
at least one processor; and
memory having program instructions stored thereon that are executable by the at least one processor to cause the first computing device to perform operations comprising:
collecting environment information pertaining to a physical environment in which the first computing device and the second computing device are located;
determining, based on the environment information, a location within the physical environment at which to place the first computing device, wherein the location is determined to satisfy a connection quality threshold for the wireless connection between the first computing device and the second computing device, wherein determining the location includes:
extrapolating a radio signal strength for the location from a radio signal strength at a current location of the first computing device within the environment; and
providing an indication of the location to a user in response to determining that the location satisfies the connection quality threshold.

12. The first computing device of claim 11, further comprising:
one or more cameras configured to capture images of the physical environment, wherein collecting environment information includes capturing, using the one or more cameras, a set of images of the physical environment.

13. The first computing device of claim 12, wherein the determining includes:
identifying one or more objects based on the set of images captured using the one or more cameras; and
estimating interferences to the wireless connection that would be caused by the one or more objects when the first computing device is placed at the location.

14. The first computing device of claim 11, further comprising:
a head-mounted display (HMD) configured to present images of the physical environment to the user, wherein providing the indication includes:
augmenting a set of images of the physical environment to include a virtual element that indicates the location; and
causing the HMD to present the set of images to the user.

15. The first computing device of claim 11, further comprising:
one or more haptic-based sensors configured to provide haptic feedback, wherein providing the indication includes:
causing the one or more haptic-based sensors to provide haptic feedback indicating the location to the user.

16. A method, comprising:
accessing environment information pertaining to a layout of a physical environment;
determining, based on the environment information, a location within the physical environment to be provided to a user of a first computing device, wherein the determined location is a location to relocate the first computing device to improve a wireless connection between the first computing device and a second computing device, wherein the location corresponds to a network bandwidth to the second computing device that satisfies a particular threshold, and wherein determining the location includes:
extrapolating a radio signal strength for the location from a radio signal strength at a current location of the first computing device within the environment; and
providing an indication of the determined location for display by the first computing device.

17. The method of claim 16, wherein the method is performed by the first computing device.

18. The method of claim 16, wherein the method is performed by the second computing device.

19. The method of claim 16, wherein accessing environment information includes:
obtaining a set of images of the physical environment captured by one or more cameras of the first computing device.

20. The method of claim 19, wherein determining the location includes:
identifying, based on the set of images, one or more physical objects within the physical environment using a set of neural networks trained on a plurality of objects that include the one or more physical objects; and
determining a set of effects on the wireless connection caused by the one or more identified physical objects.

* * * * *